Aug. 16, 1955    J. ESPOSITO, JR    2,715,466
PRECOATING OF ROTARY VACUUM DRUM FILTER
Filed Nov. 27, 1951    2 Sheets-Sheet 1
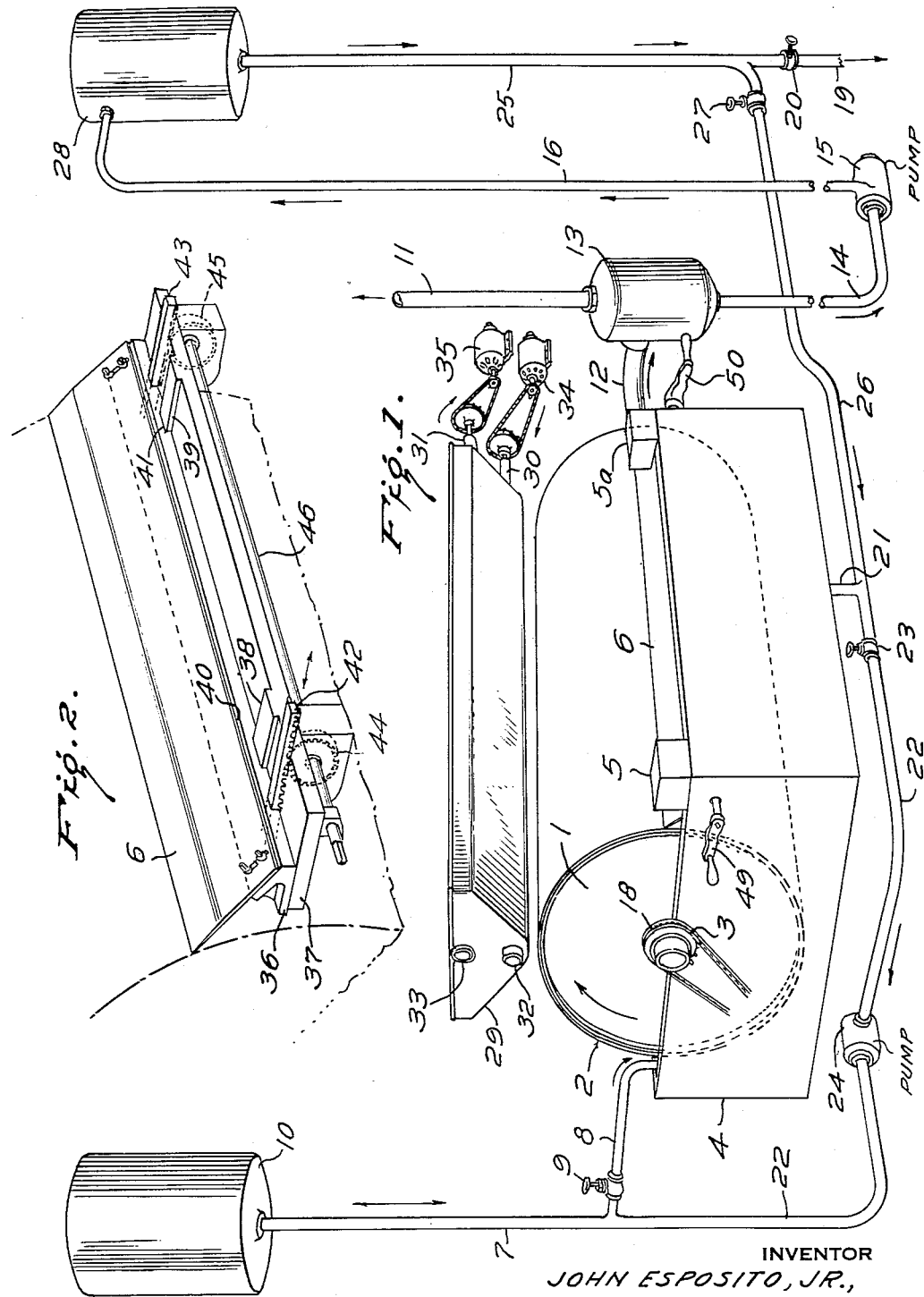
INVENTOR
JOHN ESPOSITO, JR.,
BY Evans Kahn
ATTORNEY Aug. 16, 1955   J. ESPOSITO, JR   2,715,466
PRECOATING OF ROTARY VACUUM DRUM FILTER
Filed Nov. 27, 1951   2 Sheets-Sheet 2

INVENTOR
JOHN ESPOSITO, JR.,
BY Evans Kahn
ATTORNEY

2,715,466

PRECOATING OF ROTARY VACUUM DRUM FILTER

John Esposito, Jr., Camden, N. J., assignor to American Cyanamid Company, New York, N. Y., a corporation of Maine Application November 27, 1951, Serial No. 258,480

3 Claims. (Cl. 210—199)

This invention relates to filters and to filtering. More specifically, this invention relates to a method of precoating continuous, rotary, vacuum drum filters of the clarification type and to apparatus therefor.

Filters of this type, hereinafter termed "precoat filters," are known as extremely efficient means for performing industrial clarifications, i. e., for the filtration of liquors containing slimes or only a few parts per million of solids. Essentially, these filters consist of a cloth-covered permeable filtering drum which rotates on a horizontal shaft, the lower portion of the drum being submerged in a tank or bowl containing the liquor to be filtered. The interior surface of the drum communicates with a vacuum pump through one end of the shaft made hollow for this purpose. In operation the drum, coated with a thick layer of filter aid (hereinafter called the precoat layer) is very slowly rotated through the liquor in the tank, vacuum being applied to the interior surface of the drum. Unclarified liquor is sucked through the precoat layer, which is the filtering surface, and is exhausted as clarified liquor through the hollow shaft. A stationary doctor blade extending the full length of the rotating drum continually shaves a layer of the precoat layer just thick enough to remove the layer of slimes or solids which has accumulated. As a result, a fresh precoat surface is presented continuously to the liquor in the tank with each revolution of the drum and blinding of the filtering surface is prevented. Ultimately, however, the precoat layer is substantially completely removed and must be replaced.

In the past, precoating of the drum with filter aid has been performed by a completely wet method. Typically, according to this method, an aqueous slurry of filter aid is prepared in a separate precoat slurry makeup vessel. The feed of unclarified liquor to the filter is shut off, the doctor blade withdrawn, and the bowl beneath the filtering drum is emptied to remove from the bowl all solids which would tend to blind the filter during the balance of the recoating operation. The bowl of the filter is then filled with filter aid slurry from the make-up vessel. The drum is then rotated and normal vacuum applied thereto. As a result, filter aid in the slurry is sucked on the surface of the drum forming a coating which slowly reaches the desired thickness of about two inches. As a final step, unconsumed slurry is pumped from the tank.

Variations from this method have been proposed, but all require the formation of a fluid slurry of filter aid, and the sucking of this slurry on to the surface of the drum by vacuum. Precoating by the above-described wet method typically requires at least two hours from the moment the flow of unclarified liquor is cut off to the moment when normal filtration can be resumed. The life of this precoat layer varies somewhat, depending chiefly on its initial thickness, the amount shaved off by the doctor blade with each revolution of the drum, and the rotational speed of the drum. Typically, however, the thickness of the precoat layer is not more than about 2 inches, the speed of the drum is ½ R. P. M. and the doctor blade shaves a layer $3/1000$ inch thick. Under these conditions the life of the precoat layer is about 30 hours or somewhat less, as in practice to prevent injury to the underlying cloth the drum is recoated before the precoat layer is completely removed.

The discovery has now been made that formation of a new precoat layer may be accomplished with great economy of time and effort by applying the filter aid in dry form upon the upper surface of the drum while it is wet, while vacuum is applied to the drum in the normal manner. When filter aid is applied in accordance with this, it is surprising that the same firm, dense coating is retained on the filter cloth as is built up by the slow wet method described above, and a two-inch layer can be readily deposited in 20 minutes and often in even less time.

The present invention exhibits a number of additional advantages. In the first place it eliminates the need for the filter-aid slurry make-up tank discussed above, and the stirrer, pump, and piping associated therewith, or any equipment serving an equivalent purpose. In addition, it increases the efficiency of the filter by permitting filtrations with precoat layers of reduced average thickness without increasing the percent of time during which filtering operations must be suspended for recoating. It is particularly surprising that the method of the present invention applies a precoat layer which is not inferior, but which is more compact, homogeneous, and durable than that formed by the wet method.

The degree of vacuum used in applying the precoat layer according to the process of the present invention is not critical, and need only be sufficient to cause the dry filter aid to remain on the drum as it descends into and passes through the bowl. As a vacuum of at least about 15 inches of mercury generally exists in the drum during normal filtration and a less degree of vacuum, e. g., ten inches of mercury, is ample to cause the dry filter aid to adhere to the drum, it is a further advantage of the invention that as a rule no adjustments in the supply of vacuum to the drum need be made.

Preferably, the surface of the drum is wetted simply by filling the bowl with a clear filterable liquid. As the drum rotates through this liquid it becomes sufficiently wet. Alternatively the clear liquor may be gently sprayed against the drum, preferably against the lower or rising surface thereof. The liquor may be water, but any possibility of contamination of the product is avoided by using liquor which has previously been filtered. Useful liquors of this type include sugar solutions, solutions of metal salts, and solutions of biological products. It is not advantageous to use unclarified liquor for this purpose as the particles contained therein are retained on and tend to blind the filtering surface.

The dry filter aid may be deposited in any convenient manner according to the invention. It may be sprinkled on the top of the drum manually by means of a shovel, or may be blown on to the drum through an air hose. With a little practice, a uniform coating can be readily applied in these ways. Preferably, however, the filter aid is dropped on the drum from an overhead feed trough extending the length of the drum and having a slit at least ½" wide along the bottom. A hand operated swinging feed gate may be employed to contact the flow of filter aid through this slit, but a mechanical feeder such as a star feeder is preferred which will release the particles more uniform. Preferably, a layer about ½" thick is deposited per revolution of the drum, but formation of thinner or even thicker layers per revolution is readily feasible.

Any of the filter aids in commercial use may be successfully applied according to the present invention. Such filter aids include diatomaceous earth, gypsum, calcium carbonate, activated carbon, sawdust, and paper pulp, and mixtures thereof.

The invention will be more particularly described with reference to the drawings, in which:

Figure 1 is a schematic projection of a conventional, continuous vacuum drum filter of the clarification type and associated doctor blade, pumps, valves and piping, in combination with a preferred form of filter aid distribution trough;

Figure 2 is a detailed projection of the doctor blade showing a portion of its actuating means;

In the figures, the same numbers designate the same components.

Figure 1 illustrates the filter generally known as the Oliver continuous vacuum filter, in combination with a filter aid distribution trough superimposed above the drum according to the present invention.

Figure 3:
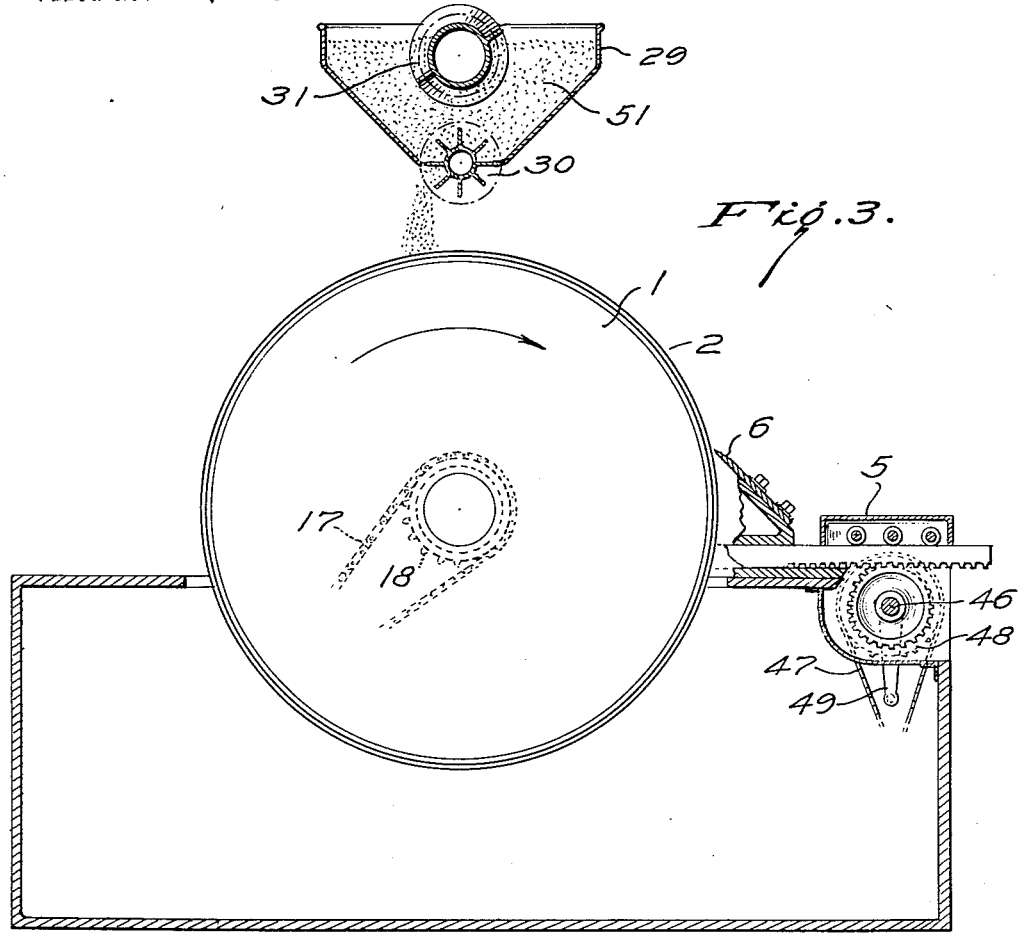
Figure 3 is a vertical section of the filter aid distribution trough of Figure 1.

In this figure, filtration drum 1 is shown as bearing a filtering surface of compacted filter aid 2. The drum is rotatably mounted within filter tank 4, and is rotated by chain 3 engaging sprocket wheel 18 powered by a conventional variable speed motor, not shown. The direction of rotation is against movable doctor blade 6 which is adapted to scrape a continuous uniformly thick layer of filter aid from the drum as it rotates. Filter aid distribution trough 29, mounted longitudinally over drum 1, contains star feeder 30 and filter aid distribution screw 31, respectively mounted in journals 32 and 33, and driven by variable speed electric motors 34 and 35. Pipes 7 and 8 permit tank 4 to be filled by gravity with unclarified liquor from unclarified liquor tank 10 by opening valve 9. Vacuum applied to the interior of the drum through lines 11 and 12 cause the liquor thus supplied to tank 4 to be sucked through the submerged body of drum 1. The thus-filtered liquor is exhausted from the drum through pipe 12, and this liquor is separated from the entrained air in vacuum separator 13. The separated clarified liquor falls downwardly through pipe 14 which is sufficiently long to cause the pressure of this liquor to become positive. From this low point the liquor is pumped by pump 15 through line 16 to clarified liquor storage tank 28. Liquor from this tank is discharged as needed for further process use by lines 25 and 19 through valve 20. Drainage sump 21 connecting with pipe 22 through valve 23 permits filter tank 4 to be emptied, the unclarified liquor therein being returned to unclarified liquor tank 10 by pump 24. When valve 23 is shut, sump 21 acts as a filling line, permitting tank 4 to be filled with clarified liquor through pipes 25 and 26 and valve 27 from clarified liquor storage tank 28.

As particularly shown in Figure 2, doctor blade 6, provided with stiffening carriage 36, is mounted on horizontal bed plate 37 having raised machined lands 38 and 39, closely engaging machined keys 40 and 41 in the stiffening carriage 36. The doctor blade is made adjustable by racks 42 and 43, fitted into stiffener 36, which engage pinions 44 and 45 driven by shaft 46. This shaft is rotated by chain 47 cooperating with sprocket 48. Power is applied to chain 47 by a variable speed motor operating through a reduction gear and clutch, not shown, by which the blade is very slowly and uniformly forced against the layer of filter aid on the drum, so as to shave a very thin layer of filter aid from the drum as it rotates. Rapid manual retraction of the doctor blade 6 is provided by handles 49, 50, which are directly attached to the ends of shaft 46. Metal housing 5—5a is provided to shield the described driving means from dirt and liquor.

With particular reference to Figure 3, the filter aid distribution trough 29 contains rotatable distribution screw 31 adapted to distribute dry filter aid 51 horizontally over the length of the trough. The thus distributed filter aid is released from the trough at a uniform, predetermined rate by rotation of star feeder 30. In this figure, doctor blade 6 is shown in a retracted position and the star feeder is shown in motion.

Figure 4:
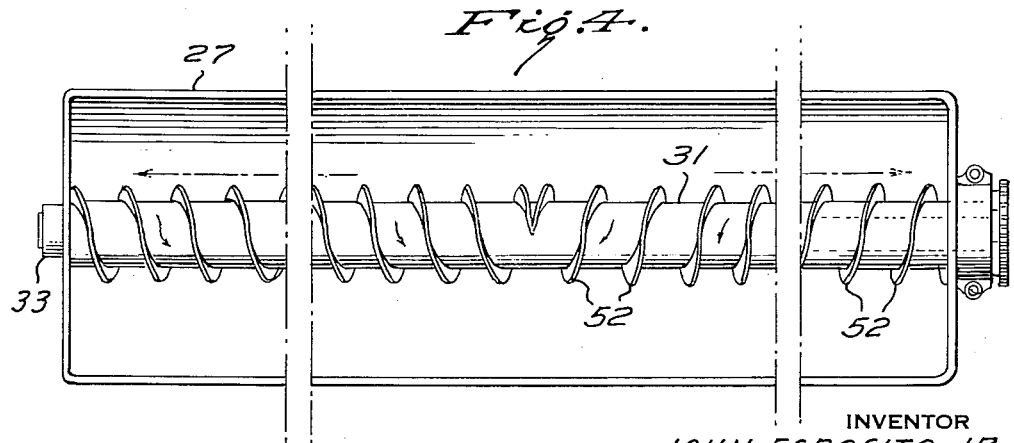
Figure 4 is a view looking vertically downward into the filter aid distribution trough shown in Figures 1 and 3.

As is shown in Figure 4, the filter aid distribution screw 31 has equal and opposite threads 52 meeting at the midpoint of the bin so that when the screw is rotated as shown by the arrows, dry filter aid deposited in the middle of the bin, as will normally be the case, is distributed evenly over the length of the trough.

During normal filtrations using the above-described apparatus, valves 23 and 27 are closed and valve 9 is open. As a result, filter tank 4 is maintained full of unclarified liquor from tank 10. This liquid is sucked through the coating of filter aid 2 and is exhausted through line 12 and vacuum separator 13, whence it is pumped to tank 28 through lines 14 and 16 by pump 15. During this filtration, doctor blade 6 is extremely slowly and regularly advanced against the coating of filter aid 2 by power applied to chain 47, shaving off an extremely thin layer of filter aid with each revolution of the drum.

When this coating of filter aid is substantially completely removed, recoating may be effected by the following procedure. Without stopping the drum or altering the vacuum supply to line 11 the power to chain 47 is disengaged and doctor blade 6 is manually retracted by rotation of handles 59 and 50 to a predetermined distance which will be slightly greater than the final desired thickness of the coating of filter aid to be applied. Valve 9 is then closed and tank 4 is emptied of unclarified liquor by opening valve 23 and returning the liquor in the tank by pump 24 through sump 21 and lines 22 and 7 to unclarified liquor storage tank 10. When the tank is empty, valve 23 is closed, pump 24 is stopped, and tank 4 is filled with clarified liquor. For this purpose valve 27 is opened, permitting clarified liquor from tank 28 to flow by gravity through lines 25 and 26 into the tank through sump 21. At this point electric motor 35 may be started actuating levelling screw 31 in filter aid distribution trough 29 and the trough filled with dry filter aid. At this point also the speed of drum 1 may be advantageously increased to about 1 R. P. M. or even more. Star feeder 30 is then set in motion by electric motor 34, the speed of this motor and the speed of rotation of drum 1 being controlled so as to cause a coating of predetermined thickness to be deposited on the wet surface of the drum. When a coating of the desired thickness has been formed, usually 1½ to 2 inches in increments of about ½ inch, motors 34 and 35 are stopped, halting the supply of filter aid, and doctor blade 6 is mechanically advanced by rotation of handles 49 and 50 until it contacts the fresh surface of filter aid on the still rotating drum. Chain drive 47 is then reengaged with its power supply so that the blade is automatically driven forward at a predetermined, very slow rate, for example, 2/1000 of an inch per revolution of the drum, and the speed of rotation of the drum is reduced to that found normal for the liquor employed. The supply of clarified liquor is shut off by closing valve 27 and the supply of unclarified liquor is resumed by open valve 9. The filter is now in condition for another cycle of filtration.

It is understood that whereas the present invention has been particularly described with reference to one specific embodiment thereof, the practice of the invention is not limited thereto, in that variations and substitutions of equivalents are possible. I intend therefore in the following claims to cover all modifications which do not depart from the spirit and scope of the invention.

I claim:

1. A method of filtering which comprises rotating the drum of a continuous rotary vacuum clarification filter through a body of clarified liquid to wet the lower portion of the drum, depositing dry filter aid on the top of the wet drum as it rotates, while maintaining sufficient vacuum on the interior of the drum to hold the filter aid in position, until a desired thickness of filter aid has been built up on the drum, replacing the body of clarified liquid with a body of unclarified liquid, rotating the filter aid covered drum through said liquid, whereby solids in said unclarified liquid are deposited on said filter aid on said drum and clarified liquid passes therethrough, shaving off a layer of said filter aid from said drum thereby removing filtered solids therefrom, continuing said filtration and said shaving until said layer of filter aid has been substantially completely shaved from said drum, draining the unfiltered portion of unclarified liquid from said filter, and repeating the cycle.

2. A method of applying a coating of filter aid to the drum of a continuous rotary vacuum drum clarification filter which comprises rotating said drum, wetting said drum with a clear filterable liquid, depositing dry filter aid on the uppermost portion of the wet surface of the drum as it rotates, and simultaneously applying sufficient vacuum to the inside of the drum to maintain the filter aid in position.

3. A method of applying a coating of filter aid to the drum of a continuous rotary vacuum drum clarification filter which comprises rotating said drum, wetting said drum with a clear filterable liquid, depositing dry filter aid on the upper wet surface of the drum as it rotates, and simultaneously applying sufficient vacuum to the entire inner surface of the drum to maintain the filter aid in position.

References Cited in the file of this patent

UNITED STATES PATENTS

| | | |
|---|---|---|
| 1,515,130 | Morrison | Nov. 11, 1924 |
| 1,859,295 | French | May 24, 1932 |
| 1,871,878 | Cahoon et al. | Aug. 16, 1932 |
| 2,139,445 | Dinwiddie | Dec. 6, 1938 |

FOREIGN PATENTS

| | | |
|---|---|---|
| 8,162 | Great Britain | 1885 |
| 41,680 | Denmark | Feb. 8, 1930 |